US009816678B2

(12) United States Patent
Krenn (10) Patent No.: US 9,816,678 B2
(45) Date of Patent: Nov. 14, 2017

(54) LIGHT-EMITTING UNIT COMPRISING A LIGHT GUIDE UNIT FOR A PROJECTOR LAMP (71) Applicant: ZIZALA LICHTSYSTEME GMBH, Wieselburg (AT)

(72) Inventor: Irmgard Krenn, Purgstall/Erlauf (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 0 days.

(21) Appl. No.: 14/652,881

(22) PCT Filed: Dec. 5, 2013

(86) PCT No.: PCT/AT2013/050236
§ 371 (c)(1),
(2) Date: Jun. 17, 2015

(87) PCT Pub. No.: WO2014/094018
PCT Pub. Date: Jun. 26, 2014

(65) Prior Publication Data
US 2015/0323146 A1 Nov. 12, 2015

(30) Foreign Application Priority Data

Dec. 20, 2012 (AT) .............................. A 50609/2012

(51) Int. Cl.
F21S 8/10 (2006.01)
F21V 8/00 (2006.01)

(52) U.S. Cl.
CPC ....... F21S 48/1241 (2013.01); F21S 48/1154 (2013.01); F21S 48/1208 (2013.01);
(Continued)

(58) Field of Classification Search
CPC ..... B60Q 1/04; F21S 48/1154; F21S 48/1335; F21S 48/1329
See application file for complete search history.

(56) References Cited

U.S. PATENT DOCUMENTS 5,404,282 A * 4/1995 Klinke .................... F21K 9/00
257/E25.028
7,534,000 B1 * 5/2009 Adachi .................. B60K 35/00
362/23.01
(Continued)

FOREIGN PATENT DOCUMENTS

DE 102011054230 A1 4/2013
EP 2037167 A3 3/2009
(Continued)

OTHER PUBLICATIONS

International Search Report of PCT/AT2013/050236 dated Mar. 31, 2014.
(Continued)

Primary Examiner — Elmito Breval
Assistant Examiner — Fatima Farokhrooz
(74) Attorney, Agent, or Firm — Eversheds Sutherland (US) LLP (57) ABSTRACT The invention relates to a light guide unit (3) for a light-emitting unit (1) for a projector lamp, in particular a motor vehicle headlamp, wherein the light-emitting unit (1) comprises a plurality of light sources (2), the light guide unit (3), and a downstream projection lens (4), wherein the light guide unit (3) has a plurality of light guides (30), wherein each light guide (30) has a light exit surface (30a), and wherein each light source (2) couples light precisely into a light guide (30) assigned thereto, and wherein adjacent light guides (30) are separated from one another by separating walls (31, 32). In accordance with the invention the light guide unit (3) comprises an accommodating element (5), which accommodating element (5) has an accommodating opening (5a) which passes completely through the accommodating element (5) in the light exit direction, and furthermore comprises at least one light guide body (6), which at least one light guide body (6) is in the form of a component (Continued)

formed separately from the accommodating element (5), in which at least one light guide body (6) at least some of the light guides (30) of the light guide unit (3) are formed, and wherein the at least one light guide body (6) is inserted into the accommodating opening (5a) of the accommodating element (5).

34 Claims, 4 Drawing Sheets

(52) U.S. Cl.
CPC ....... *F21S 48/1305* (2013.01); *F21S 48/1317* (2013.01); *F21S 48/1388* (2013.01); *F21S 48/1747* (2013.01); *G02B 6/0068* (2013.01); *G02B 6/0078* (2013.01); *F21S 48/125* (2013.01)

(56) References Cited

U.S. PATENT DOCUMENTS

| | | | | |
|---|---|---|---|---|
| 7,914,162 | B1* | 3/2011 | Huang | B60L 1/14 219/220 |
| 8,596,844 | B1* | 12/2013 | Yeh | F21S 48/215 362/507 |
| 2004/0085779 | A1* | 5/2004 | Pond | B60Q 1/04 362/516 |
| 2004/0114392 | A1* | 6/2004 | Hou | B60Q 1/2696 362/545 |
| 2005/0140270 | A1 | 6/2005 | Henson et al. | |
| 2006/0067077 | A1* | 3/2006 | Kumthampinij | F21L 4/027 362/294 |
| 2006/0083014 | A1 | 4/2006 | Kanzler et al. | |
| 2008/0253144 | A1 | 10/2008 | Dolson et al. | |
| 2009/0073712 | A1 | 3/2009 | Yamamura et al. | |
| 2009/0168439 | A1* | 7/2009 | Chiang | F21S 8/04 362/404 |
| 2009/0257215 | A1* | 10/2009 | Gomi | G02F 1/133605 362/97.1 |
| 2009/0262544 | A1* | 10/2009 | Wu | B60Q 1/2696 362/459 |
| 2010/0046217 | A1* | 2/2010 | Ngai | F21S 8/086 362/235 |
| 2010/0079991 | A1* | 4/2010 | Zhang | F21V 15/01 362/235 |
| 2011/0249434 | A1 | 10/2011 | McQuistian et al. | |
| 2011/0280031 | A1 | 11/2011 | Luger et al. | |
| 2013/0094234 | A1* | 4/2013 | Kloos | B60Q 1/00 362/511 |
| 2013/0094236 | A1* | 4/2013 | Kloos | F21V 7/00 362/516 |
| 2013/0114277 | A1 | 5/2013 | Faffelberger | |
| 2013/0155712 | A1* | 6/2013 | Kloos | F21S 48/1154 362/521 |
| 2013/0215632 | A1 | 8/2013 | Jackl et al. | |
| 2013/0223089 | A1 | 8/2013 | Danner et al. | |
| 2013/0235605 | A1 | 9/2013 | Bohm | |
| 2013/0308329 | A1 | 11/2013 | Danner et al. | |
| 2014/0036477 | A1* | 2/2014 | Jang | G02F 1/133615 362/97.1 |
| 2014/0043843 | A1 | 2/2014 | Moser et al. | |
| 2014/0063832 | A1* | 3/2014 | Lin | B60Q 1/0035 362/518 |
| 2014/0071662 | A1* | 3/2014 | D'Antonio | E04B 9/32 362/147 |
| 2014/0169014 | A1 | 6/2014 | Jungwirth et al. | |
| 2014/0204602 | A1 | 7/2014 | Jungwirth et al. | |
| 2014/0246980 | A1 | 9/2014 | Petsch | |
| 2014/0321141 | A1 | 10/2014 | Bauer et al. | |
| 2014/0321148 | A1 | 10/2014 | Bauer et al. | |
| 2014/0334167 | A1 | 11/2014 | Tiefenbacher | |
| 2015/0008840 | A1 | 1/2015 | Reinprecht et al. | |
| 2015/0023037 | A1 | 1/2015 | Bauer et al. | |
| 2015/0023045 | A1 | 1/2015 | Bauer et al. | |
| 2015/0043233 | A1 | 2/2015 | Bauer et al. | |
| 2015/0049501 | A1 | 2/2015 | Bauer et al. | |
| 2015/0078022 | A1 | 3/2015 | Bauer | |
| 2015/0085523 | A1 | 3/2015 | Gurtl et al. | |
| 2015/0103548 | A1 | 4/2015 | Reitinger et al. | |
| 2015/0124469 | A1 | 5/2015 | Krenn et al. | |
| 2015/0192264 | A1 | 7/2015 | Holzl et al. | |

FOREIGN PATENT DOCUMENTS

| | | |
|---|---|---|
| EP | 2280215 A2 | 2/2011 |
| FR | 2048179 | 3/1971 |
| WO | 2010106096 A1 | 9/2010 |
| WO | 2014012128 A1 | 1/2014 |

OTHER PUBLICATIONS

First Office Action of Austrian Application No. 50609/2012 dated Sep. 19, 2013.

Second Office Action of Austrian Appliction No. 50609/2012 dated Jul. 25, 2014.

\* cited by examiner

LIGHT-EMITTING UNIT COMPRISING A LIGHT GUIDE UNIT FOR A PROJECTOR LAMP

The invention relates to a light guide unit for a light-emitting unit for a projector lamp, in particular a motor vehicle headlamp, wherein the light-emitting unit comprises a plurality of light sources, the light guide unit and a downstream projection lens, wherein the light guide unit has a plurality of light guides, wherein each light guide has a light exit surface, and wherein each light source couples light precisely into a light guide assigned thereto, and wherein adjacent light guides are separated from one another by separating walls.

The invention also relates to a light-emitting unit comprising a light guide unit of this type.

Lastly, the invention also relates to a vehicle headlamp for a motor vehicle comprising at least one light-emitting unit of this type.

With a light-emitting unit of the above-mentioned type it is possible to construct a light function, such as a dipped beam distribution or a main beam distribution, from a plurality of partial light distributions. These partial light distributions can be controlled individually by individual control of the light sources, such that, for example, parts of the light distribution can be selectively masked or dimmed or only certain parts of the light distribution can be switched on or dimmed. It is thus possible to control the light distribution practically arbitrarily depending on the driving situation.

Functions that can be provided by means of this technique include, for example, partial main beam, in which segments in the light pattern of the main beam distribution are switched off so as not to dazzle the oncoming traffic, shifting of the centre of the light in the dipped beam (compare cornering light), and reduction of the front-field light distribution so as to avoid dazzling oncoming traffic when the road is wet (adverse weather light), etc.

The individual light segments in the light distribution are generated by means of light guides, which are combined to form a light guide unit and by means of which light guides the light from the artificial light sources is irradiated in a bundled manner in the emission direction. The light guides have a relatively small cross section and therefore emit the light of the individual light sources assigned to each of said light guides in a very concentrated manner in the emission direction. AT 510 437 A4 in this regard discloses a light module that has a light guide in the form of an optical waveguide, referred to there as a light tunnel, and also has a plurality of light sources.

The concentrated emission of the light guides is desirable, for example in order to satisfy legal requirements with regard to the light/dark line of the dipped beam of a motor vehicle headlamp. In addition, sharply delimited light segments generated by means of the light guides have the advantage that precisely delimited regions in a light pattern can be masked out.

Inevitably, in order to be able to generate light segments separate from one another, the light guides are separated from one another. Here, a light guide unit that has a number of light guides is usually manufactured in one piece (or sometimes in two pieces: a front and a rear part as considered in the light exit direction—however this is secondary for the present invention), and the individual light guides are separated from one another, specifically by walls or separating webs, which extend in the light exit direction as far as the region of the light exit surfaces of the individual light guides. The light guide units are typically formed form metal or plastic, and in the case of a two-part construction as just mentioned above, the two parts may also be manufactured from different materials.

With the "one-piece" manufacture of the light guide unit with the light guides formed therein, however, there is the disadvantage that the wall thickness of the (separating) walls or (separating) webs between adjacent light guides in the region of the light exit surfaces of the light guides has a certain value, which, in terms of manufacture, cannot be undershot or can only be undershot at great cost. However, an excessively large wall thickness of the separating walls between the light guides means that stripes form in the light pattern, in particular vertical and/or horizontal stripes.

The object of the invention is to create a light-emitting unit for projector lamps, with which the above-described disadvantageous effects can be prevented or significantly reduced in a simple and economical manner.

The object is achieved with a light guide unit as mentioned in the introduction for a light-emitting unit in that, in accordance with the invention, the light guide unit comprises an accommodating element, which accommodating element has an accommodating opening which passes completely through the accommodating element in the light exit direction, and furthermore comprises at least one light guide body, which at least one light guide body is in the form of a component formed separately from the accommodating element, in which at least one light guide body at least some of the light guides of the light guide unit are formed, and wherein the at least one light guide body is inserted into the accommodating opening of the accommodating element.

Due to the separate design of the light guides in the form of at least one separate light guide body, this body can be processed optimally in terms of manufacture and the suitable material can be used in order to provide minimal wall thicknesses of the separating walls, which separate adjacent light guides from one another, in particular in the region of the light exit surfaces of the light guides.

The at least one light guide body is preferably secured fixedly in the accommodating opening of the accommodating element.

Following the insertion and positioning, the at least one light guide body is secured fixedly, generally non-detachably, in the accommodating opening in the correct lighting position so that the position of the least one light guide body can no longer change, not even as a motor vehicle is being driven.

By way of example, the light guide body is heat staked to the accommodating element, or the two parts are latched to one another.

Precisely one light guide body is particularly advantageously provided and has all light guides of the light guide unit.

Should it be favourable, for structural reasons, etc., two or more light guide bodies may also be provided, which for example are arranged laterally adjacently in the installed position. However, it is generally sufficient when merely one light guide body is used, which practically fills out the entire accommodating opening the accommodating element. The use of a single light guide body generally has advantages in terms of manufacture and storage, and the assembly of the light guide unit also is much easier and quicker with just one light guide body.

In accordance with a specific embodiment the least one light guide body in the installed position has light guides arranged laterally adjacently and extending substantially over the entire height of the light guide body.

A row of adjacent light guides is produced in this way.

In accordance with a further improved embodiment retaining openings, for example retaining slots, for accommodating at least one separating web arranged substantially horizontally in the installed position are provided in the least one light guide body.

Here, in accordance with a specific embodiment, retaining openings, for example retaining slots, for precisely two separating webs are provided, wherein the retaining openings are arranged in such a way that in the installed position one separating web lies above the second separating the web, and wherein the inserted separating webs divide the light guides extending over the entire height of the light guide body into three rows of light guides.

With three rows of light guides a far region, a front-field region in the region of a light/dark boundary (for example for a dipped beam), and a front-field close region for illumination of the region directly in front of the vehicle can be produced in the light pattern, for example.

Furthermore, the at least one separating web extends over substantially the entire width of the at least one light guide body. This has on the one hand manufacturing advantages and allows on the other hand a simple, accurate positioning or retention of the light guide body at the accommodating element, as will be explained in greater detail in the description below.

It is of particular advantage when the at least one light guide body is formed from an elongate and flat, preferably planar element, on which element a number of bend lines are provided, which bend lines extend normal to the longitudinal sides of the element, and wherein the element is bent at the bend lines in such a way that continuous light guides which extend over the entire height of the light guide body and are arranged directly adjacently are formed.

Such an element can be formed thinner particularly easily at least in the region of the portions forming the separating walls between the light guides in the region of the light exit surfaces, such that the separating walls between the light guides in the region of the light exit surfaces can then also be formed thinner.

Specifically, two bend lines here extend in each case in pairs at a first distance from one another, wherein adjacent pairs of bend lines are arranged at a second distance from one another, which is greater than the first distance, wherein the second distance is measured between two adjacent bend lines of adjacent pairs of bend lines, and wherein the element is bent over the two bend lines of a bend line pair in each case in the same direction by 90°, and wherein the bend lines of adjacent bend line pairs are bent in opposite directions.

Adjacently arranged, vertical light guides are formed in this way.

In order to obtain light guides of equal width, the distance between two bend lines of a bend line pair is identical for all bend line pairs of the element.

In order to obtain light guides of identical height that are continuous over the entire height, the distance between two adjacent bend line pairs is identical between all bend line pairs of the element.

Furthermore, in accordance with a specific embodiment the element has, on a longitudinal side, portions protruding in each case between two bend line pairs, which portions in the finished state form the vertical separating walls between vertical light guides in the region of the light exit surfaces of the light guides.

These portions offer a possibility for the vertical centring of the light guide body in the accommodating opening. In addition, these portions preferably are formed with minimal (wall) thickness, since these form the vertical separating walls between the light guides in the region of the light exit surfaces. The light guide body is inserted into the accommodating opening and secured there by means of the regions projecting upwardly and downwardly over these portions in the bent state.

In accordance with a simple embodiment of the invention the protruding portions run in a straight line, i.e. are formed parallel to the opposite longitudinal side.

The light exit surfaces of the light guides preferably lie in a focal plane of the projection lens. Accordingly, the light exit surfaces are curved. In order to implement this the protruding portions are therefore preferably curved, more specifically curved towards the opposite longitudinal side.

A curvature of the light exit surfaces in the vertical direction can thus be provided.

Here, the curved portions typically have, approximately in the centre thereof, a minimal distance from the opposite longitudinal side.

In order to provide a curvature of the light exit surfaces in the horizontal direction, the protruding portions have the greatest distance from the opposite longitudinal side in the two laterally outer regions of the element, and the distances of the protruding portions from the opposite longitudinal side decrease from both sides with a progression along the longitudinal side in the direction of the centre of the element.

In order to produce two or more horizontal rows of light guides, the at least one retaining opening, for example a retaining slot, or preferably the two retaining openings or retaining slots for the at least one separating web, preferably for two separating webs, is/are arranged in the region of the protruding portions and is/are preferably formed as slot-shaped indentations extending from the protruding portions normal to the longitudinal sides into the element.

The protruding portions that form continuous vertical light guides are in this way divided in the vertical direction.

Furthermore, the longitudinal side opposite the protruding portions is formed continuously in a straight line.

With regard to material it has proven to be favourable when the element is a sheet metal element. Such a sheet metal element can be easily processed and is economical and stable.

In order to be able to produce a minimal thickness in the region of the protruding portions, i.e. a low thickness of the vertical separating walls between the light guides, in particular in the region of the light exit surfaces, the element may have a continuous thickness, preferably of approximately 0.1 mm.

However, it may then be that the element cannot withstand the mechanical loads in particular during installation and deforms slightly, for example bends.

In accordance with another advantageous embodiment the element is manufactured, preferably embossed, at least, and preferably merely, in the region of the separating walls between the vertical light guides, preferably in the region of the light exit surfaces, to a defined thickness, preferably a thickness of approximately 0.1 mm.

The element thus can be dimensioned so as to be sufficiently strong to withstand the mechanical loads and is manufactured with low(er) thickness only in the optically relevant regions, i.e. in those regions that constitute the vertical separating walls in the region of the light exit surfaces.

In accordance with a specific embodiment of the invention the element is stamped in its pre-bent form.

Furthermore, the light guide body or the element, preferably the sheet metal element, advantageously reflects light, preferably has a high-gloss finish. Mirror plates that have a degree of reflection>95% are preferably used for this purpose.

In particular the element, preferably the sheet metal element, reflects light and in particular has a high-gloss finish on both sides.

Furthermore, the at least one separating web advantageously reflects light and preferably has a high-gloss finish, preferably reflects light and in particular has a high-gloss finish on both sides.

The accommodating element is preferably formed from a plastic. This can be shaped particularly easily.

Furthermore, the accommodating element also advantageously reflects light, and in particular has a high-gloss finish, in the accommodating opening thereof at least in the upper and/or lower region, preferably is coated, for example by means of vapour deposition, with a light-reflecting, in particular high-gloss coating.

The light guides of the upper and lower row are delimited upwardly and downwardly respectively by the upper and lower inner side respectively of the accommodating element, such that it is advantageous when these regions also reflect light.

By way of example, the at least one light guide body is painted so as to reflect light, in particular so as to have a high-gloss finish.

The invention will be explained in greater detail hereinafter on the basis of the drawing with reference to an exemplary embodiment of the invention. In the drawing

Figure 1:
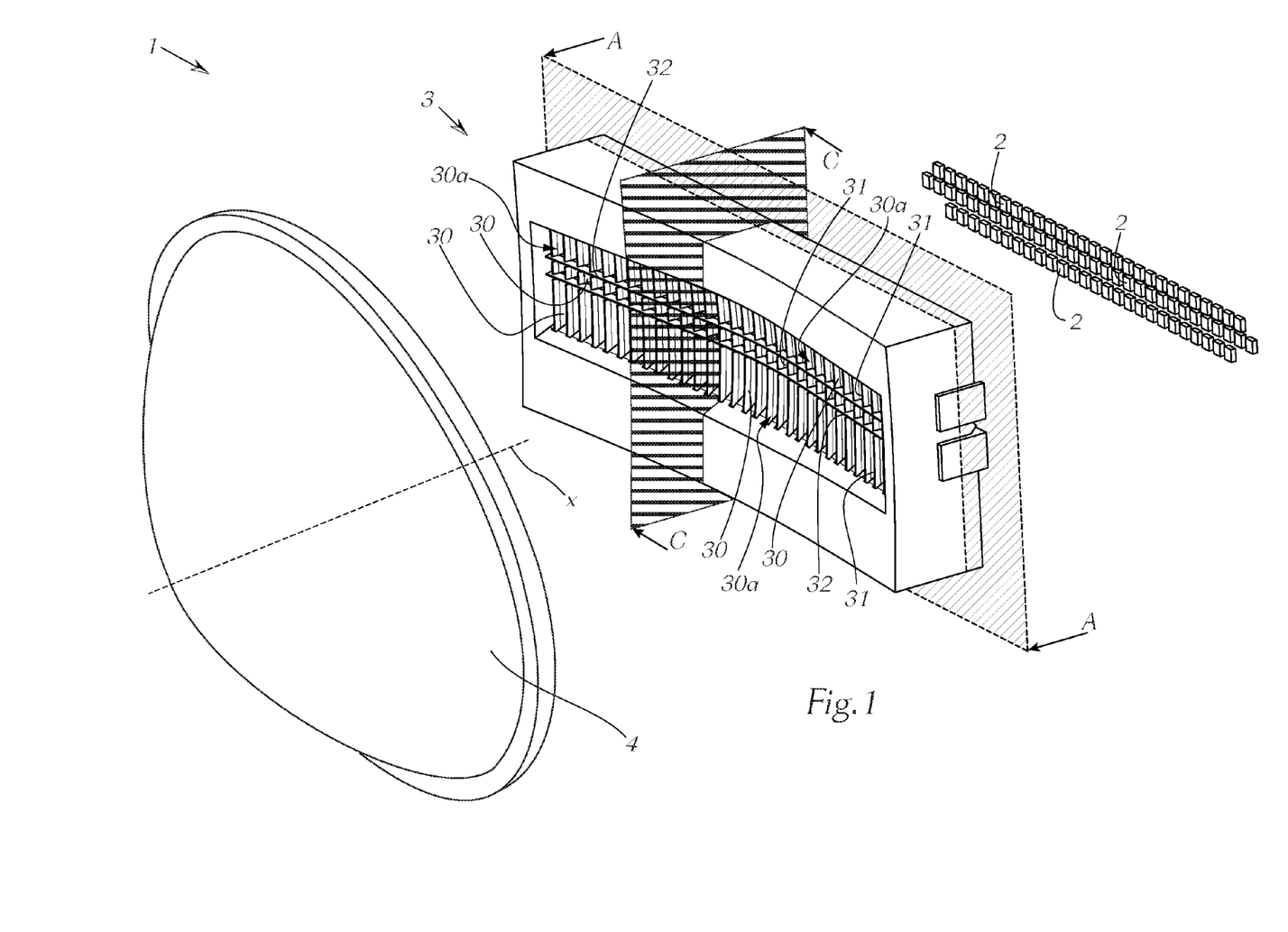
FIG. 1 shows a perspective exploded illustration of a light-emitting unit with a light guide unit according to the invention.

FIG. 1 shows a light-emitting unit 1 according to the invention for a motor vehicle headlamp, consisting of a plurality of light sources 2, a light guide unit 3 having a plurality of light guides 30, and a downstream projection lens 4. Each light guide 30 has a light exit surface 30*a*, and, via a light coupling-in surface not visible in the figures, each light source 2 couples light precisely into the light guide 30 assigned thereto.

The light sources 2 are LED light sources, wherein each LED light source 2 comprises at least one or precisely one light-emitting diode. Here, each LED light source 2 preferably can be controlled and can be switched on and off and/or can be dimmed separately, wherein, preferably with two or more light-emitting diodes per LED light source, each light-emitting diode of an LED light source can be controlled and can be switched on and off and/or can be dimmed separately.

The light guides 30 are arranged adjacently in the light guide unit 3 and, in the shown example, in three rows arranged above one another. The light guides 30 are oriented here substantially in the direction of an optical axis x associated with the projection lens 4.

In the shown embodiment the light guides 30 are formed as reflectors, i.e. form a hollow tube so to speak, and have light exit surfaces 30*a*, which are designed to irradiate the light in the direction of the downstream projection lens 4. The light exit surfaces 30*a*, as well as the light coupling-in surfaces (not visible), are thus delimited openings in the light guide unit 3.

The light guides 30 are each delimited by two substantially vertical (separating) walls 31 and two substantially horizontal (separating) walls 32. The light guides 30 of the upper and lower row are rectangular in the shown example, whereas the light guides of the middle row are square. The vertical walls 31 each delimit laterally adjacently arranged light guides 30 and separate these from one another, and in addition the light guides 30 of the middle row are separated from one another from above and below by the horizontal separating walls 32.

In fact, the reference signs 31 and 32 designate the respective walls in the region of the light exit surfaces 30*a* of the light guides 30. Since, however, it is clear to a person skilled in the art what is meant, the reference signs 31, 32 are used both for the separating walls and the edges thereof in the region of the light exit surfaces 30*a*. If it makes a difference whether the edge or the entire separating wall is concerned, this will be mentioned explicitly in the text.

These separating walls 31, 32 then have a certain wall thickness produced by the manufacturing process in the region of the light exit surfaces 30*a*; if this wall thickness is too great, vertical and horizontal stripes will form in the light pattern between the activated light segments.

A light guide unit is normally manufactured in one piece. Here, however, there is the disadvantage that the wall thickness of the (separating) walls or (separating) webs between adjacent light guides in the region of the light exit surfaces of the light guides has a certain value, which, in terms of manufacture, cannot be undershot or can only be undershot at great cost. However, an excessively large wall thickness of the separating walls between the light guides means that stripes form in the light pattern, in particular vertical and/or horizontal stripes.

Figure 2:
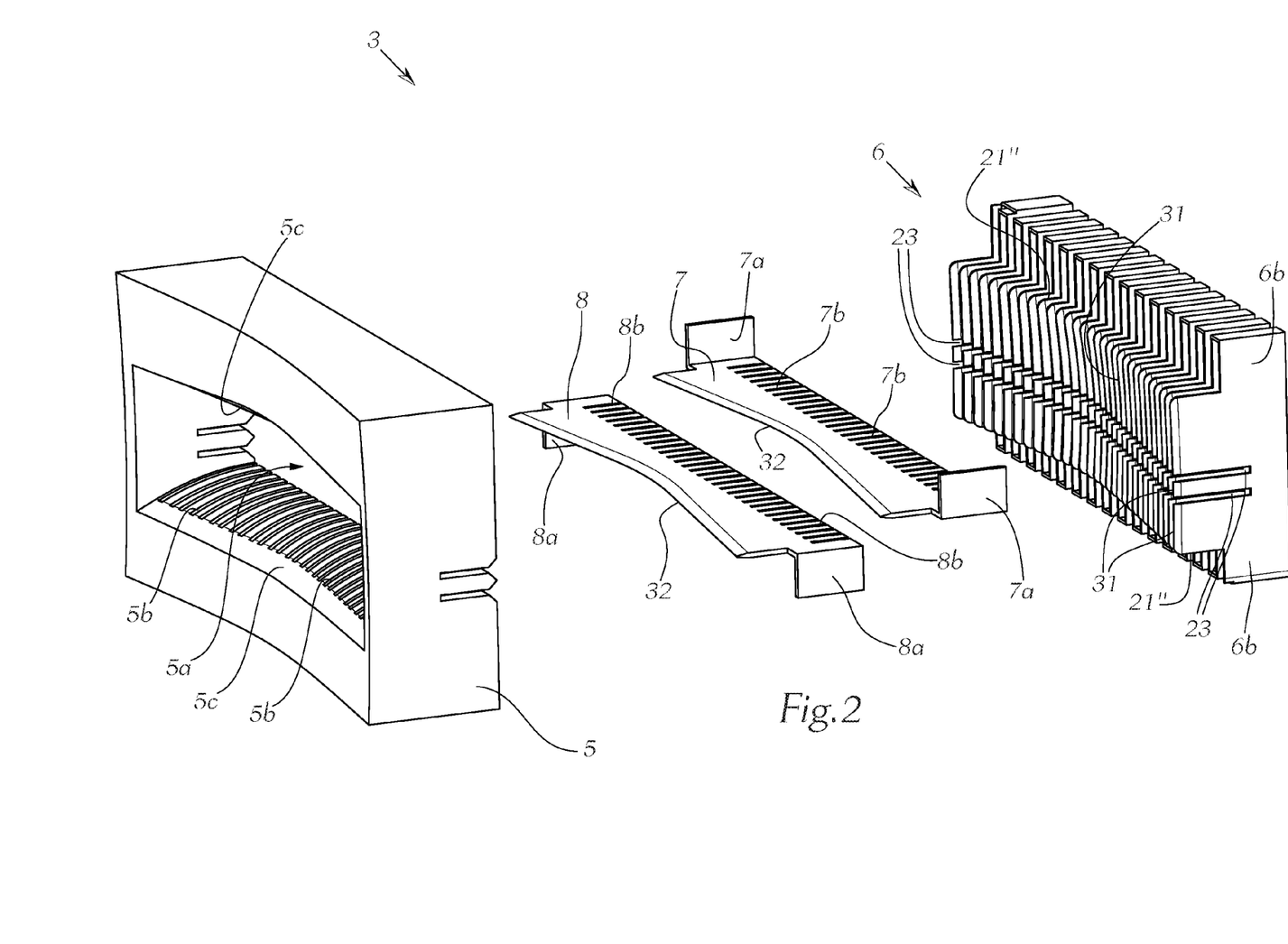
FIG. 2 shows a perspective exploded illustration of a light guide unit according to the invention.

In order to now be able to produce low wall thicknesses in particular in the region of the light exit surfaces 30*a* of the light guides 30 in a simple manner, the light guide unit 3 has an accommodating element 5, as can be clearly seen in FIG. 2, which accommodating element 5 has an accommodating opening 5*a* which passes completely through the accommodating element 5 in the light exit direction. It furthermore comprises a light guide body 6, which is in the form of a component formed separately from the accommodating element 5. The light guides 30 of the light guide unit 3 are formed in the light guide body 6. The light guide body 6 is inserted into the accommodating opening 5*a* of the accommodating element 5, such that the light guide unit 3 shown in FIG. 1 is formed.

Due to the separate design of the light guides 30 in the form of a separate light guide body 6, this light guide body 6 can be processed optimally in terms of manufacture and the suitable material can be used in order to provide minimal wall thicknesses of the separating walls 31, which separate adjacent light guides 30 from one another, in particular in the region of the light exit surfaces 30*a* of the light guides 30.

The light guide body 6 is secured here fixedly, generally non-detachably, in the accommodating opening 5*a* of the accommodating element 5 so that the position of the light guide body can no longer change, not even as a motor vehicle is being driven.

By way of example, the light guide body 6 is heat staked to the accommodating element 5, or the two parts 5, 6 are latched to one another.

Figure 4:
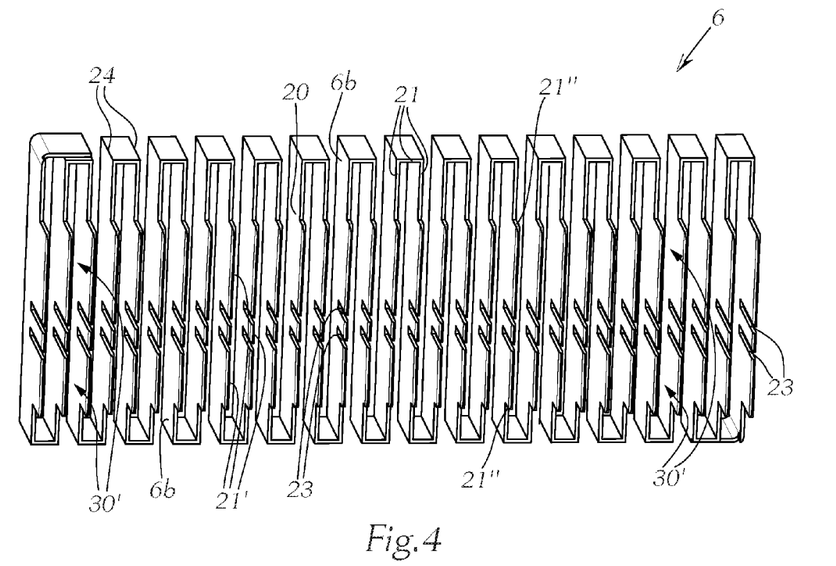
FIG. 4 shows a light guide body formed from a sheet metal element from FIG. 3 in a perspective view.

The light guide body 6 in the installed position, as can be seen particularly clearly in FIG. 2 and FIG. 4, has light guides 30' arranged laterally adjacently and extending substantially over the entire height of the light guide body 6, such that a row of adjacently arranged light guides 30' is provided with the light guide body 6.

Furthermore, retaining openings, for example retaining slots 23, for accommodating two separating webs 7, 8 arranged substantially horizontally in the installed position are provided in the light guide body 6. Here, the separating web 7 lies above the separating web 8, such that the inserted separating webs 7, 8 divide the light guides 30' extending over the entire height of the light guide body 6 into three rows of light guides 30.

With three rows of light guides a far region, a front-field region in the region of a light/dark boundary (for example for a dipped beam), and a front-field close region for illumination of the region directly in front of the vehicle can be produced in the light pattern, for example.

In the front region the separating webs 7, 8 converge in narrow edges 32 (or the separating webs 7, 8 are formed accordingly so as to be continuously narrow); these edges 32 in the inserted state delimit the light exit surfaces 30*a* in the horizontal direction. The separating webs 7, 8, as individual parts, at least in the region of the edges 32 thereof, can be formed easily with low wall thickness, such that horizontal stripes in the light pattern can be reduced or completely eliminated.

The separating webs 7, 8, extend over substantially the entire width of the light guide body 6. This has manufacturing advantages on the one hand and on the other hand allows a simple, accurate positioning or retention of the light guide body at the accommodating element, as will be explained in greater detail in the description below.

The separating webs 7, 8 project laterally slightly beyond the light guide body 6 and are then bent upwardly and downwardly (see FIGS. 1 and 2 in particular) by approximately 90° via portions 7*a*, 8*a*. The light guide body 6 is inserted from the rear into the accommodating opening 5*a* of the accommodating element 5, the accommodating element 5 having one or more stops (specifically the end regions of the slots 5*b*) in the accommodating opening 5*a* in the front region, such that the position of the light guide body 6 in the insertion direction is defined. Prior to the insertion of the light guide body 6, the separating webs 7, 8 are inserted into the light guide body 6 from the front into the retaining openings 23. As a result of the insertion from the front, the separating webs 7, 8 are secured in the light guide body 6 against a displacement in the light exit direction following the insertion of the light guide body 6 into the accommodating opening 5*a*.

The horizontal separating webs 7, 8 additionally have slots 7*b*, 8*b*, which are arranged at the same distance from one another as the vertical separating walls 21' forming the light guides 30'. The separating webs 7, 8 can thus also be inserted into the retaining slots 23 such that the separating webs 7, 8 engage via their slots 7*b*, 8*b* around the vertical separating walls in a rear region and the separating webs 7*b*, 8*b* therefore can no longer be displaced laterally with respect to the light guide body 6. The separating webs 7, 8 are connected to the light guide body 6 by this latching.

The bent portions 7*a*, 8*b* of the separating webs 7, 8 engage around the accommodating element 5 from outside following the insertion of the light guide body 6 into the accommodating opening 5*a*, such that the light guide body 6 is secured against a lateral movement on the accommodating element 5.

The light guide body 6 is usually heat staked in the plastic retainer 5 for example, or is connected thereto in another manner. The separating webs 7, 8 are then retained automatically, as described above, between the light guide body 6 and the plastic retainer 5. However, it is certainly also possible to connect the separating webs additionally to the light guide body and additionally to one another using known methods.

Figure 3:
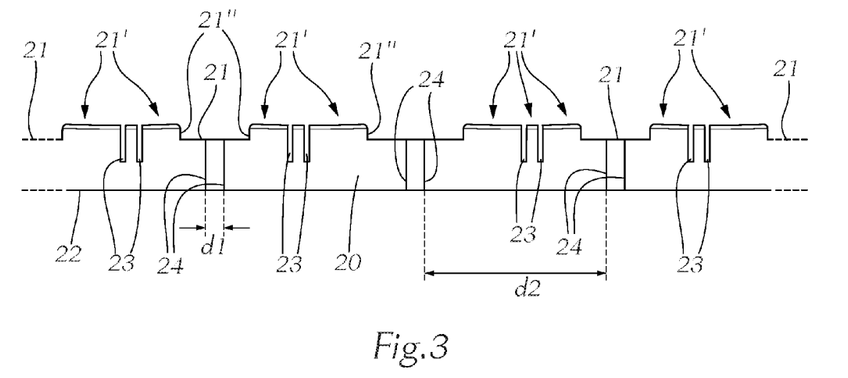
FIG. 3 shows a sheet metal element for forming the light guide body prior to the bending process.

In terms of manufacture the light guide body 6 is formed from an elongate and flat, preferably planar element 20. Such an element 20 is shown in FIG. 3. A number of bend lines (24) are provided on this element 20 and extend normal to the longitudinal sides 21, 22 of the element 20, wherein the element 20 is bent at the bend lines 24 in such a way that continuous light guides 30' extending over the entire height of the light guide body 6 and arranged directly adjacently are formed.

FIG. 4 shows the element 20 from FIG. 3 after the bending process.

Such an element 20 can be formed particularly easily at least in the region of the portions 21' of low thickness delimiting the separating walls between the light guides in the region of the light exit surfaces, such that the (vertical) separating walls 31 can also be formed with low wall thickness between the light guides 30 in the region of the light exit surfaces 30*a*.

Specifically, two bend lines 24 here extend in each case in pairs at a first distance $d1$ from one another, wherein adjacent pairs of bend lines 24 are arranged at a second distance $d2$ from one another, which is greater than the first distance $d1$, wherein the second distance $d2$ is measured between two adjacent bend lines 24 of adjacent pairs of bend lines 24, and wherein the element 20 is bent over the two bend lines 24 of a bend line pair in each case in the same direction by 90°, and wherein the bend lines 24 of adjacent bend line pairs are bent in opposite directions.

Adjacently arranged, vertical light guides 30' are formed in this way (see FIG. 4).

In order to obtain light guides 30', 30 of equal width, the distance $d1$ between two bend lines 24 of a bend line pair is identical for all bend line pairs of the element 20.

In order to obtain light guides of identical height that are continuous over the entire height, the distance $d2$ between two adjacent bend line pairs is identical between all bend line pairs of the element 20.

In order to form the vertical separating walls 31 the element 20 has, on a longitudinal side 21, portions 21' protruding in each case between two bend line pairs, which portions in the finished state form the vertical separating walls 31 between vertical light guides 30'; 30 in the region of the light exit surfaces 30*a* of the light guides 30'; 30.

These portions 21' on the one hand offer a possibility for the vertical centring of the light guide body 6 in the accommodating opening 5*a*, and on the other hand these portions 21' can be formed with minimal (wall) thickness particularly easily. The light guide body is inserted into the accommodating opening and positioned/secured there by means of the region 6*b* (see FIGS. 2, 4 and 5) projecting upwardly and downwardly over the light guides 30' in the bent state.

In accordance with a simple embodiment of the invention the protruding portions 21' run in a straight line, i.e. are formed parallel to the opposite longitudinal side 22.

The light exit surfaces 30a of the light guides 30 preferably lie in a focal plane of the projection lens 4, as is shown in FIG. 1. Accordingly, the light exit surfaces 30a are preferably curved and the separating walls 31, 32 are thus curved, as can be clearly seen in FIG. 2. In order to implement this, the protruding portions 21' are therefore preferably curved, more specifically curved towards the opposite longitudinal side 22. A curvature of the light exit surfaces in the vertical direction can thus be provided.

Here, the curved portions preferably have, approximately at the lower surface of the upper separating web 7, a minimal distance from the opposite longitudinal side 22.

In order to also provide a curvature of the light exit surfaces in the horizontal direction, the protruding portions 21' have the greatest distance from the opposite longitudinal side 22 in the two laterally outer regions of the element 20, and the distances of the protruding portions 21' from the opposite longitudinal side 22 decrease from both sides with a progression along the longitudinal side in the direction of the centre of the element 20.

These curved portions, however, are indicated only to a minimal extent in FIG. 3 and also cannot be seen particularly clearly in FIG. 4, since these two figures are intended merely to illustrate the forming of a light guide body (FIG. 4) from a planar element (FIG. 3), however the curvatures in both directions can be clearly seen in FIG. 2.

The two retaining openings or retaining slots 23 for the two separating webs 7, 8 are arranged in the region of the protruding portions 21' and are preferably formed as slot-shaped indentations extending from the protruding portions 21' normal to the longitudinal sides 21, 22 into the element 20.

Furthermore, the longitudinal side 22 opposite the protruding portions 21' is formed continuously in a straight line.

Figure 6:
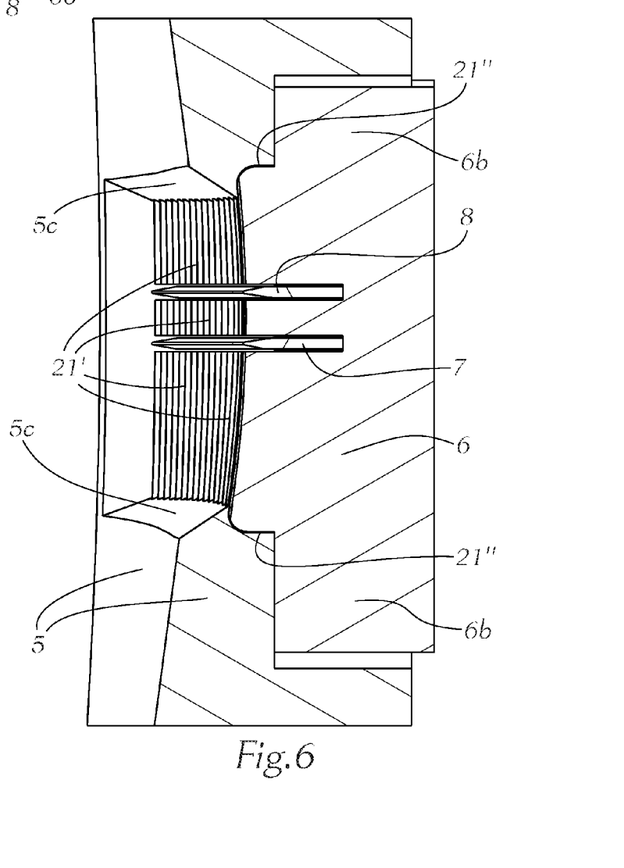
FIG. 6 shows a section along the plane C-C through a light guide unit from FIG. 1.

FIGS. 3 and 4 and also FIG. 6 show portions 21", which connect the longitudinal side portions 21 to the protruding portions 21' (these portions 21" are arranged for example approximately normal to the longitudinal side portions 21). These portions 21" are used for the vertical centring of the light guide body 6 in the accommodating opening 5 (see FIG. 6). The accommodating opening 5a is formed in such a way that, following the insertion of the light guide body 6, this lines up upwardly and downwardly with the portions 21" on the accommodating opening 5a and is thus positioned in the vertical direction.

The following applies in principle in order to position the light guide body 6 in the accommodating opening 5a. Following or at the same time as the insertion of the separating webs 7, 8 into the light guide body 6, this is inserted from the rear into the accommodating opening 5a, as already described. In the upper and lower region, the accommodating opening 5a has slots 5b extending in the light exit direction. By means of the regions 6b (see FIGS. 2, 4 and 5) projecting upwardly and downwardly over the light guides 30', the light guide body 6 is inserted into the slots 5b, until it rests in abutment. The light guide body 6 rests in abutment upwardly via the portions 21" against the accommodating opening 5b (see FIG. 6). A lateral displacement is prevented by the bent portions 7b, 8b of the separating webs 7, 8.

Figure 5:
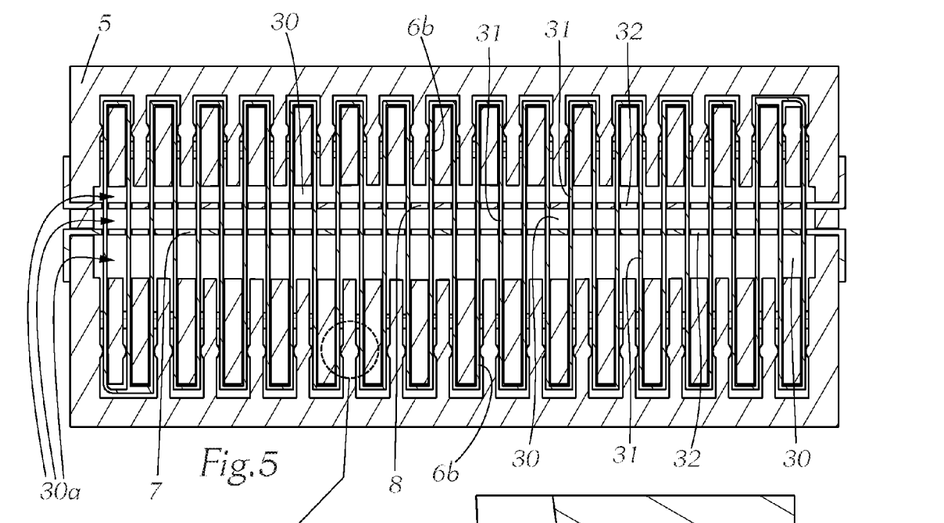
FIG. 5 shows a section along the plane A-A through a light guide unit from FIG. 1.
Figure 5A:
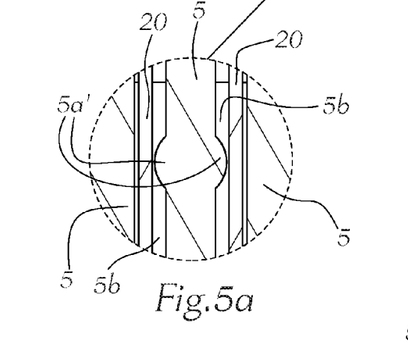
FIG. 5*a* shows a detail from FIG. 5 in the region of the slots in the accommodating opening.

Under consideration of FIG. 5a, which shows a detail from FIG. 5, the slots 5b may also have narrowing points, as illustrated. The slots 5b have a greater width than the wall thickness of the element 20 in the region 6b. Due to the narrowing points, which are provided by a narrowing element 5b' protruding laterally in the slot 5b, the light guide body 6 is held in the slots 5b in a clamped manner following the insertion.

The element 20 is preferably a sheet metal element. In order to provide a minimal thickness in the region of the protruding portions 21', i.e. a low thickness of the vertical separating walls 31 between the light guides 30, in particular in the region of the light exit surfaces 30a, the element 20 may have a continuous thickness, preferably of approximately 0.1 mm.

In another embodiment, however, the element 20 is advantageously manufactured, preferably is embossed, merely in the region of the separating walls 21' between the vertical light guides 30', preferably in the region of the light exit surfaces 30a, to a defined thickness, preferably a thickness of approximately 0.1 mm, whereas the element has a greater thickness in the other regions and the element is thus formed in a more stable manner. Merely in the optically important region of the light exit surfaces, which region is projected in the light pattern, does the element thus have a low(er) thickness (compared with the rest of the element).

In accordance with a specific embodiment of the invention the element 20 is stamped in its pre-bent form as illustrated in FIG. 3. The element 20 is practically stamped out from a larger element, such as a sheet metal element, in the form in which it is ultimately subjected to the bending process. The various embodiments, such as slots, protrusions, are thus stamped into the starting material before this is then bent along the bend lines.

The element 20 reflects light, preferably is formed with a high-gloss finish, wherein it advantageously reflects light and in particular is formed with a high-gloss finish on both sides. By way of example, the light guide body 6 is painted with a high-gloss finish.

The accommodating element 5 is advantageously formed from a plastic. The accommodating element 5 in its accommodating opening 5a is furthermore also advantageously formed at least in the upper and lower region 5c in a manner so as to reflect light, in particular with a high-gloss finish, and is preferably coated, for example by means of vapour deposition, with a light-reflecting, in particular high-gloss coating.

The separating webs 7, 8 also reflect light and in particular are formed with a high-gloss finish (preferably on both sides), and for example are painted.

The light guides of the upper and lower row are delimited upwardly and downwardly by the upper and lower inner side respectively of the accommodating element, such that it is advantageous when these regions also reflect light.

The invention claimed is:

1. A light guide unit (3) for a light-emitting unit (1) for a motor vehicle headlamp or other projector lamp, wherein the light-emitting unit (1) comprises a plurality of light sources (2), the light guide unit (3), and a downstream projection lens (4), the light guide unit (3) comprising:
 a plurality of light guides (30), wherein each light guide (30) comprises a light exit surface (30a), and wherein each light source (2) couples light precisely into a light guide (30) assigned thereto, and wherein adjacent light guides (30) are separated from one another by separating walls (31, 32);
 an accommodating element (5), which has an accommodating opening (5a) which passes completely through the accommodating element (5) in the light exit direction; and
 at least one light guide body (6), which is in the form of a component formed separately from the accommodating element (5), in which at least one light guide body (6) at least some of the light guides (30) of the light guide unit (3) are formed, and wherein the at least one light guide body (6) is inserted into the accommodating opening (5a) of the accommodating element (5), wherein the plurality of light sources (2) are positioned outside of the accommodating element (5) on one side of the accommodating opening (5a) such that light from the plurality of light sources (2) is coupled into the light guides (30) of the light guide body (6) and exits the light exit surface (30a) on an opposite side of the accommodating opening (5a).

2. The light guide unit of claim 1, wherein the at least one light guide body (6) is secured fixedly in the accommodating opening (5a) of the accommodating element (5).

3. The light guide unit of claim 1, wherein precisely one light guide body (6) is provided, which comprises all light guides (30) of the light guide unit (3).

4. The light guide unit of claim 1, wherein the at least one light guide body (6) in an installed position has light guides (30') arranged laterally adjacently and extending substantially over the entire height of the light guide body (6).

5. The light guide unit of claim 1, wherein the at least one light guide body (6) is formed from an elongate and flat element (20), on which a number of bend lines (24) are provided, which bend lines (24) extend normal to longitudinal sides (21, 22) of the element (20), and wherein the element (20) is bent at the bend lines (24) in such a way that continuous light guides (30') are formed which extend over the entire height of the light guide body (6) and are arranged directly adjacent thereto.

6. The light guide unit of claim 1, wherein the accommodating element (5) is formed from a plastic.

7. The light guide unit of claim 1, wherein the accommodating element (5) reflects light and has a high-gloss finish in the accommodating opening (5a) thereof at least in the upper and/or lower region.

8. The light guide unit of claim 1, wherein the at least one light guide body is painted so as to reflect light.

9. A light-emitting unit (1) for a vehicle headlamp comprising at least one light guide unit (3) according to claim 1.

10. The light guide unit of claim 4, wherein the at least one light guide body (6) comprises retaining slots (23) or other retaining openings for accommodating at least one separating web (7, 8) arranged substantially horizontally in the installed position.

11. The light guide unit of claim 10, wherein the retaining slots (23) or other retaining openings are provided for precisely two separating webs (7, 8), wherein the retaining openings (23) are arranged in such a way that in the installed position one separating web (7) lies above the second separating web (8), and wherein the inserted separating webs (7, 8) divide the light guides (30') extending over the entire height of the light guide body (6) into three rows of light guides (30).

12. The light guide unit of claim 10, wherein the at least one separating web (7, 8) extends over substantially the entire width of the at least one light guide body (6).

13. The light guide unit of claim 10, wherein the at least one separating web (7, 8) reflects light and has a high-gloss finish on one or both sides.

14. The light guide unit of claim 5, wherein two bend lines (24) extend in each case in pairs at a first distance (d1) from one another, wherein adjacent pairs of bend lines (24) are arranged at a second distance (d2) from one another, which is greater than the first distance (d1), wherein the second distance (d2) is measured between two adjacent bend lines (24) of adjacent pairs of bend lines (24), and wherein the element (20) is bent over the two bend lines (24) of a bend line pair in each case in the same direction by 90°, and wherein the bend lines (24) of adjacent bend line pairs are bent in opposite directions.

15. The light guide unit of claim 5, wherein the element (20) has, on a longitudinal side (21), portions (21') protruding in each case between two bend line pairs, which portions in the finished state form the vertical separating walls (31) between vertical light guides (30'; 30) in the region of the light exit surfaces (30a) of the light guides (30'; 30).

16. The light guide unit of claim 5, wherein the element (20) is a sheet metal element.

17. The light guide unit of claim 5, wherein the element (20) has a continuous thickness of approximately 0.1 mm.

18. The light guide unit of claim 5, wherein the element (20) is embossed, at least in the region of the separating walls (21') between the vertical light guides (30') to a defined thickness of approximately 0.1 mm.

19. The light guide unit of claim 5, wherein the element (20) is stamped in its pre-bent form.

20. The light guide unit of claim 5, wherein the light guide body (6) or the element (20) reflects light and has a high-gloss finish.

21. The light guide unit of claim 5, wherein the element (20) is provided in the region of the separating walls (21') between the vertical light guides (30') in the region of the light exit surfaces.

22. The light guide unit of claim 14, wherein the distance (d1) between two bend lines (24) of a bend line pair is identical for all bend line pairs of the element (20).

23. The light guide unit of claim 14, wherein the distance (d2) between two adjacent bend line pairs is identical between all bend line pairs of the element (20).

24. The light guide unit of claim 15, wherein the protruding portions (21') run in a straight line.

25. The light guide unit of claim 15, wherein the protruding portions (21') are curved towards an opposite longitudinal side (22).

26. The light guide unit of claim 15, wherein the protruding portions (21') have the greatest distance from the opposite longitudinal side (22) in the two laterally outer regions of the element (20), and in that the distances of the protruding portions (21') from the opposite longitudinal side (22) decrease from both sides with a progression along the longitudinal side in the direction of the centre of the element (20).

27. The light guide unit of claim 15, wherein the at least one retaining slot (23) or other retaining opening for the at least one separating web is arranged in the region of the protruding portions (21') and formed as slot-shaped indentations extending from the protruding portions (21') normal to the longitudinal sides (21, 22) into the element (20).

28. The light guide unit of claim 15, wherein the longitudinal side (22) opposite the protruding portions (21') is formed continuously in a straight line.

29. The light guide unit of claim 25, wherein the curved protruding portions have, approximately in the centre thereof, a minimal distance from the opposite longitudinal side (22).

30. The light guide unit of claim 20, wherein the element (20) reflects light and has a high-gloss finish on both sides.

31. The light guide unit of claim 7, wherein the accommodating opening (5a) at least in the upper and/or lower region is coated with a light reflecting coating.

32. The light guide unit of claim 8, wherein the painted light guide body has a high gloss finish.

33. A vehicle headlamp comprising at least one light-emitting unit according to claim 9.

34. The light guide unit of claim 31, wherein the light reflecting coating is provided by vapour deposition.

* * * * *